United States Patent
Emura et al.

(10) Patent No.: US 9,726,283 B2
(45) Date of Patent: Aug. 8, 2017

(54) ELECTRIC FRONT DERAILLEUR

(71) Applicant: Shimano Inc., Sakai, Osaka (JP)

(72) Inventors: Atsuhiro Emura, Osaka (JP); Kazuya Kuwayama, Osaka (JP)

(73) Assignee: Shimano Inc., Osaka (JP)

( * ) Notice: Subject to any disclaimer, the term of this patent is extended or adjusted under 35 U.S.C. 154(b) by 482 days.

(21) Appl. No.: 13/671,100

(22) Filed: Nov. 7, 2012

(65) Prior Publication Data

US 2014/0128190 A1    May 8, 2014

(51) Int. Cl.
| | | |
|---|---|---|
| *F16H 63/30* | (2006.01) | |
| *B62M 9/132* | (2010.01) | |
| *B62M 9/1342* | (2010.01) | |
| *B62M 9/136* | (2010.01) | |

(52) U.S. Cl.
CPC ......... *F16H 63/3013* (2013.01); *B62M 9/132* (2013.01); *B62M 9/1342* (2013.01); *B62M 9/136* (2013.01)

(58) Field of Classification Search
CPC ..... B62M 9/132; B62M 25/08; B62M 9/1342
USPC .................................................. 474/80, 82
See application file for complete search history.

(56) References Cited

U.S. PATENT DOCUMENTS

| | | | | |
|---|---|---|---|---|
| 4,030,374 A | * | 6/1977 | Isobe | 474/82 |
| 4,226,130 A | * | 10/1980 | Isobe | 474/82 |
| 5,213,548 A | * | 5/1993 | Colbert et al. | 474/71 |
| 5,779,581 A | * | 7/1998 | Fujii | 474/82 |
| 6,979,009 B2 | * | 12/2005 | Ichida et al. | 280/238 |
| 7,341,532 B2 | * | 3/2008 | Ichida et al. | 474/70 |
| 7,704,173 B2 | | 4/2010 | Ichida et al. | |
| 7,722,487 B2 | | 5/2010 | Ichida et al. | |
| 2002/0165054 A1 | * | 11/2002 | Chen | 474/82 |
| 2003/0027674 A1 | * | 2/2003 | Valle | 474/70 |
| 2004/0166973 A1 | * | 8/2004 | Nanko | 474/80 |
| 2005/0197222 A1 | * | 9/2005 | Tatsumi | 474/80 |
| 2007/0184925 A1 | * | 8/2007 | Ichida et al. | 474/80 |
| 2014/0128189 A1 | * | 5/2014 | Kuwayama et al. | 474/82 |
| 2014/0287856 A1 | * | 9/2014 | Kuwayama et al. | 474/80 |

* cited by examiner

*Primary Examiner* — Michael Riegelman
(74) *Attorney, Agent, or Firm* — Global IP Counselors, LLP

(57) ABSTRACT

An electric front derailleur includes a base member, a chain guide, a first link member, a second link member and an electric driving unit. The base member includes a mounting portion to be operatively mounted to a bicycle frame. The chain guide is movable with respect to the base member. The first link member movably connects the chain guide to the base member. The first link member is at least partially aligned with the chain guide in a lateral direction with the electric front derailleur in an installed position. The second link member movably connects the chain guide to the base member. The second link member is at least partially aligned with the chain guide in the lateral direction with the electric front derailleur in the installed position. The electric driving unit is operatively coupled to the chain guide to move the chain guide with respect to the base member.

31 Claims, 7 Drawing Sheets

ELECTRIC FRONT DERAILLEUR

BACKGROUND

Field of the Invention

This invention generally relates to an electric front derailleur. More specifically, the present invention relates to an electric front derailleur having configuration that provides for a compact arrangement in a vertical or height direction with the electric front derailleur in the installed position.

Background Information

Generally, a front derailleur is mounted to the bicycle frame adjacent to the front chain rings to shift a chain laterally between the front chain rings. A front derailleur includes a fixed or base member that is non-movably secured to the bicycle frame. A front derailleur further includes a movable member or chain guide that is movably supported relative to the fixed member such that the chain guide moves between at least two lateral shift positions to shift the chain between the front chain rings. Typically, a linkage assembly is coupled between the fixed member and the chain guide in order to movably support the chain guide. Some front derailleurs are provided with an electric motor for moving the movable member relative to the fixed member. The chain guide typically has a pair of cage plates or guide plates arranged to selectively contact and move the chain between the front chain rings. The cage plates or guide plates form lateral sides of a chain cage portion of the chain guide.

SUMMARY

Generally, the present disclosure is directed to an electric front derailleur. In one feature, an electric front derailleur is configured to provide a compact arrangement in a vertical or height direction with the electric front derailleur in the installed position.

In view of the state of the known technology, an electric front derailleur is provided that basically comprises a base member, a chain guide, a first link member, a second link member and an electric driving unit. The base member includes a mounting portion to be operatively mounted to a bicycle frame. The chain guide is movable with respect to the base member. The first link member movably connects the chain guide to the base member. The first link member is at least partially aligned with the chain guide in a lateral direction with the electric front derailleur in an installed position. The second link member movably connects the chain guide to the base member. The second link member is at least partially aligned with the chain guide in the lateral direction with the electric front derailleur in the installed position. The electric driving unit is operatively coupled to the chain guide to move the chain guide with respect to the base member.

Other objects, features, aspects and advantages of the disclosed electric front derailleur will become apparent to those skilled in the art from the following detailed description, which, taken in conjunction with the annexed drawings, discloses a preferred embodiment of the electric front derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
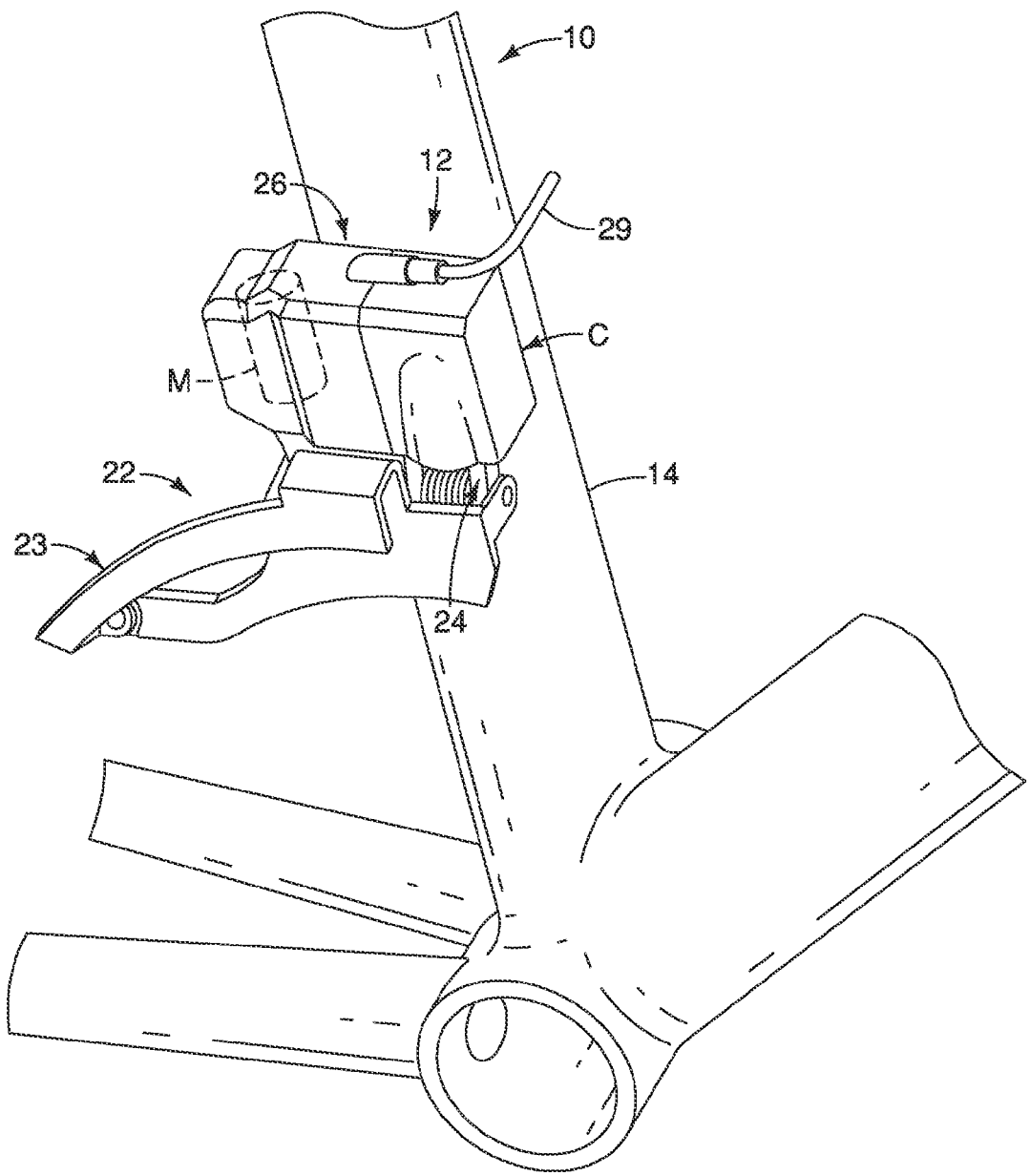
FIG. 1 is a partial side perspective view of a bicycle frame that is equipped with an electric front derailleur in accordance with one embodiment.
Figure 2:
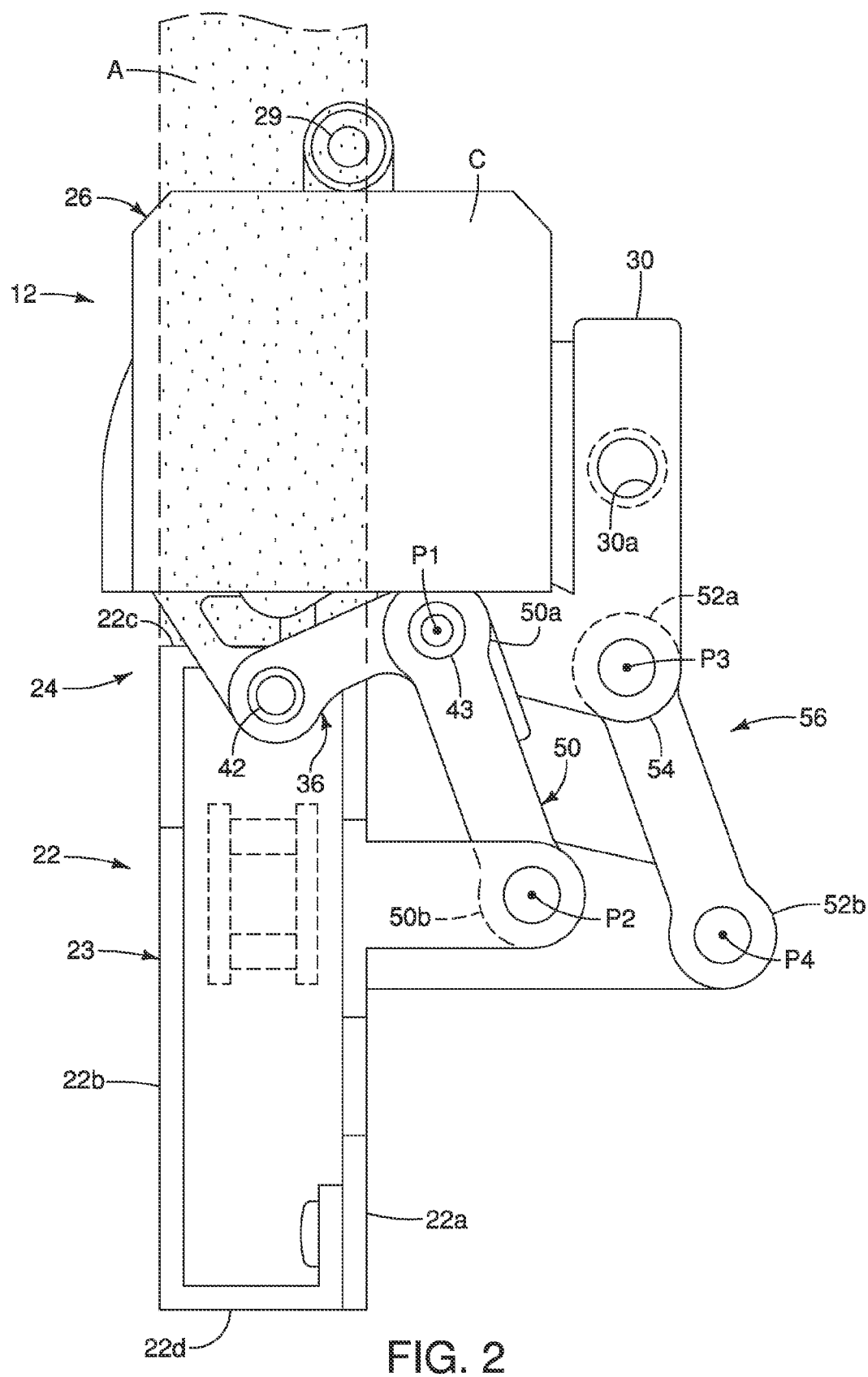
FIG. 2 is an enlarged front elevational view of the electric front derailleur illustrated in FIG. 1 with the chain guide in the low position (i.e., the fully retracted position)
Figures 3, 4:
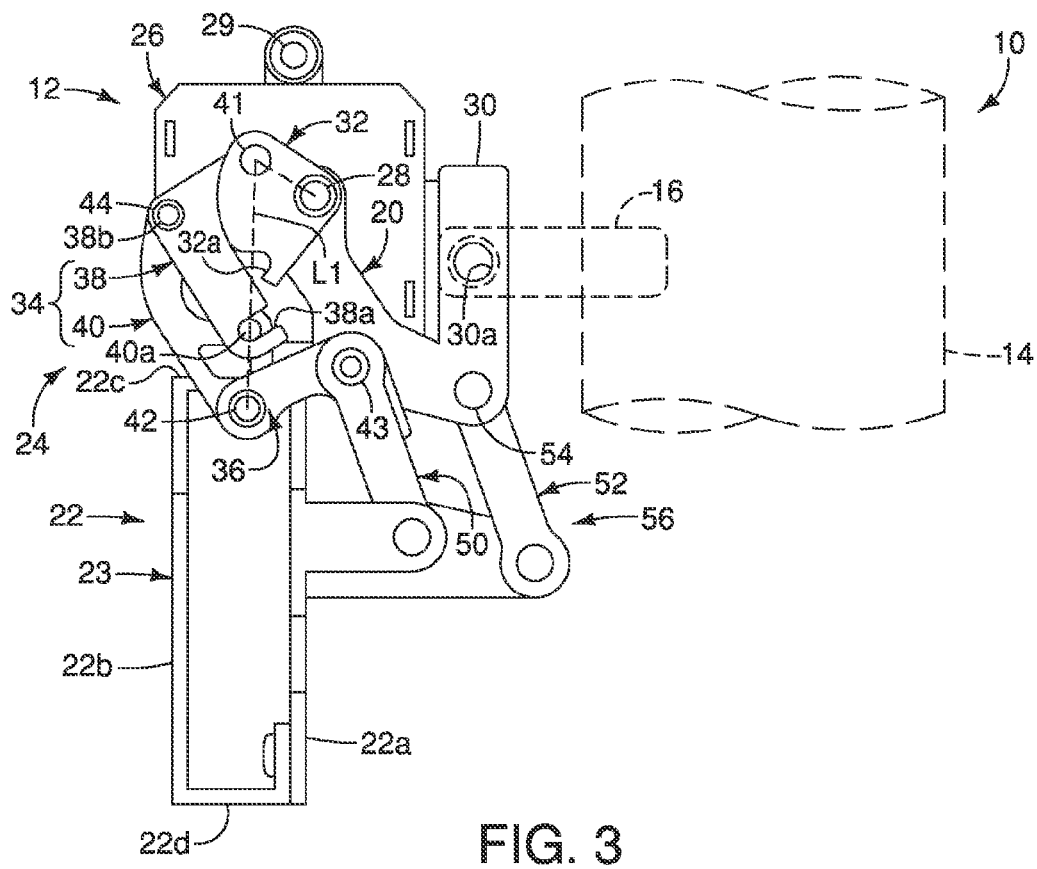
FIG. 3 is a front elevational view of the electric front derailleur illustrated in FIG. 1 with the cover of the housing of the electric driving unit removed and the chain guide in the low position.
FIG. 4 is a graph plotting the actuation ratio with respect to the transverse movement of the chain guide of the electric front derailleur illustrated in FIG. 1, wherein the movable member is in the low position.

Referring initially to FIG. 1, a portion of a bicycle frame 10 is illustrated with an electric front derailleur 12 in accordance with a first embodiment. As seen in FIGS. 1 and 2, the electric front derailleur 12 is illustrated in an installed position. As used herein to describe the electric front derailleur 12, the following directional terms "forward", "rearward", "above", "downward", "vertical", "horizontal", "below" "lateral" and "transverse" as well as any other similar directional terms refer to directions with respect to an upright bicycle equipped with the electric front derailleur 12 on a level surface. Accordingly, these terms, as utilized to describe the electric front derailleur 12 should be interpreted relative to an upright bicycle that is equipped with the electric front derailleur 12 in an installed position on a level surface. As seen in FIG. 2, the electric front derailleur 12 has a configuration that provides for a compact arrangement in a vertical or height direction with the electric front derailleur 12 in the installed position. The electric front derailleur 12 is mounted to a seat tube 14 of the bicycle frame 10 in a conventional manner. For example, as seen in FIG. 3, a conventional braze-on hanger 16 that is fixed to the seat tube 14. Of course, other types of mounting arrangements, e.g. a band type, can be used as needed and/or desired.

Referring to FIGS. 2 and 3, the derailleur 12 basically includes a base member 20, a chain guide 22 (e.g., a movable member) and a connecting structure 24, which interconnects the base member 20 and the chain guide 22 together. In FIGS. 1 and 2, the connecting structure 24 (FIG. 3) is partially concealed by a cover C. In the illustrated embodiment, the derailleur 12 further includes an electric driving unit 26 with an electric reversible motor M therein as seen in FIG. 1. The cover C is secured to the housing of the electric driving unit 26 by a plurality of snap-fitted connections or by other suitable fasteners such as screws.

The electric driving unit 26 is supported on the base member 20 above the chain guide 22. This configuration helps in providing a vertically compact arrangement of the electric front derailleur 12 in the installed position. Basically, the electric driving unit 26 is operatively coupled to the chain guide 22 to move the chain guide 22 with respect to the base member 20. In other words, the electric driving unit 26 is configured to move the chain guide 22 with respect to the base member 20. In particular, the electric driving unit 26 is operatively connected to the connecting structure 24 such that the electric driving unit 26 drives the connecting structure 24 so as to move the chain guide 22 relative to the base member 20. As seen in FIG. 3, the electric driving unit 26 has an output shaft 28 that constitutes an input member, which is connected to the connecting structure 24 such that the electric driving unit 26 drives the connecting structure 24 to move the chain guide 22 relative to the base member 20. An electrical cord 29 of the motor M is connected to a battery (not shown) and/or a generator (not shown). Preferably, a gear reduction unit (not shown) is provided between the motor M and the output shaft 28. Since gear reduction units are commonly used in electric derailleurs, the gear reduction unit of the electric driving unit 26 will not be discussed and/or illustrated herein. While the derailleur 12 is illustrated as an electric front derailleur, the connecting structure 24 can be operated by a cable with minor modifications. In other words, the electric driving unit 26 can be replaces with a cable operated arrangement.

As seen in FIG. 3, the base member 20 includes a bicycle mounting portion 30 to be operatively mounted to a bicycle frame 10. The bicycle mounting portion 30 has a threaded hole 30a that receives a mounting bolt (not shown) for attaching the derailleur 12 to the seat tube 14 by the braze-on hanger 16 in a conventional manner. The base member 20 constitutes a fixed member, since the base member 20 is fixed relative to the seat tube 14.

Figure 11:
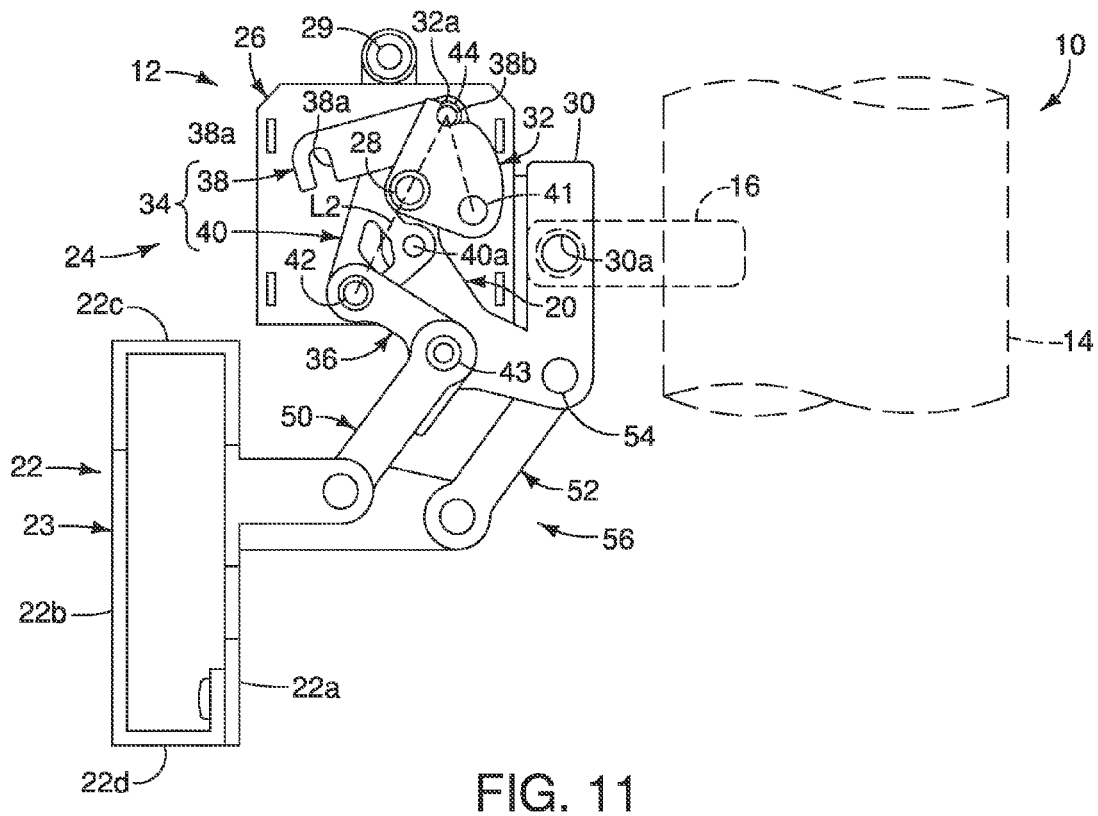
FIG. 11 is a front elevational view of the electric front derailleur illustrated in FIG. 1 with the chain guide in the top position (i.e., the fully extended position)

As seen in FIGS. 3, 5, 7, 9 and 11, the chain guide 22 is movable with respect to the base member 20 between a first position as seen in FIG. 3 and a second position as seen in FIG. 11. The second position of the chain guide 22 is farther than the first position of the chain guide 22 from the base member 20 in a lateral direction with respect to a vertical center longitudinal plane of the bicycle 10. In the illustrated embodiment, the first position of the chain guide 22 corresponds to a low position (i.e., the fully retracted position) of the derailleur 12. On the other hand, in the illustrated embodiment, the second position of the chain guide 22 corresponds to a top position (i.e., the fully extended position) of the derailleur 12. The derailleur 12 is designed to be used with a bicycle that has three front sprockets. Thus, the chain guide 22 is movable with respect to the base member 20 to an intermediate or middle position between the first and second positions as seen in FIG. 8.

The chain guide 22 includes an inner plate 22a, an outer plate 22b, a top connecting member 22c and a bottom connecting member 22d. The inner plate 22a and the outer plate 22b are laterally spaced apart and connected to each other at upper portions by the top connecting member 22c and connected to each other at lower portions by the bottom connecting member 22d to define a chain cage portion 23. The chain cage portion 23 of the chain guide 22 defines a chain receiving slot therein. Thus, the chain guide 22 has a chain cage portion 23 through which a chain (shown in dashed lines in FIG. 2) passes. The inner plate 22a pushes the chain up onto a larger sprocket during an upshift operation. The outer plate 22b pulls the chain inward onto a smaller sprocket during a downshift operation.

As mentioned above, the connecting structure 24 is arranged and configured to enable the electric driving unit 26 to move the chain guide 22 with respect to the base member 20 between the first and second positions. Here, the connecting structure 24 basically includes a driving link 32, a connecting link 34 and a driven link 36. The driving link 32 is fixedly mounted to the output shaft 28 (i.e., the input member) such that the driving link 32 rotates together with the output shaft 28. Thus, the driving link 32 is rotatably arranged on the base member 20 by the output shaft 28. The connecting link 34 connects the driving link 32 and the driven link 36. The driven link 36 is operatively coupled to the chain guide 22.

Preferably, the connecting link 34 includes a first arm 38 and a second arm 40. The first arm 38 includes a first slot 38a. The second arm 40 includes a first switching pin 40a that selectively engages the first slot 38a as the chain guide 22 moves between the first and second positions. The first arm 38 includes a second switching pin 38b that selectively engages a second slot 32a of the driving link 32 as the chain guide 22 moves between the first and second positions. The second switching pin 38b is disposed along the pivot axis defined by the fourth pivot shaft 44. In particular, the switching pin 38b is an extension of the fourth pivot shaft 44. As discussed below, this arrangement of the switching pins 38b and 40a and the slot 32a and 38a provides for an actuation ratio that descends and then ascends as the chain guide 22 moves from the first position towards the second position.

The connecting link 34 is pivotally connected to the driving link 32 by a first pivot shaft 41, and is further pivotally connected to the driven link 36 by a second pivot shaft 42. More specifically, the first arm 38 is pivotally connected to the driving link 32 by the first pivot shaft 41, and the second arm 40 is pivotally connected to the driven link 36 by the second pivot shaft 42. The driven link 36 is pivotally connected to the base member 20 by a third pivot shaft 43. The first arm 38 and the second arm 40 are pivotally connected to each other by the fourth pivot shaft 44.

In the illustrated embodiment, the chain guide 22 is movably coupled to the base member 20 by a first link member 50 and a second link member 52. The connecting structure 24 is arranged and configured to operatively couple the output shaft 28 of the electric driving unit 26 coupled to the chain guide 22 through at least one of the first and second link members 50 and 52, Here, in the illustrated embodiment, the first member 50 is operatively connected with the electric driving unit 26 by the driven link 36, which is connected to the driving link 32 by the connecting link 34. As mentioned above, the driving link 32 is operatively coupled to the output shaft 28 of the electric driving unit 26. Thus, the driving link 32 is operatively coupled to the output shaft 28 of the electric driving unit 26 and the first link member 50. As seen in FIG. 3, the driven link 36 is fixedly coupled to the first link member 50. However, the driven link 36 can be coupled to the second link member 52. Thus, the driven link 36 is coupled to one of the first and second link members 50 and 52. Since the first link member 50 is closer to the chain cage portion 23 than the second link member 52 in the illustrated embodiment, the first link member 50 is more preferably fixedly coupled with the driven link 36.

As seen in FIG. 2, the first link member 50 is pivotally connected to the base member 20 by the third pivot shaft 43. The second link member 52 is pivotally connected to the base member 20 by a pivot shaft 54. The first and second link members 50 and 52 movably connect the chain guide 22 to the base member 20. Thus, the first and second link members 50 and 52 define a four bar linkage 56 that operatively connects the chain guide 22 to the base member 20. In other words, the four bar linkage 56 extends between the base member 20 and the chain guide 22. The linkage 56 is arranged at a location spaced from an area A directly above the chain cage portion 23 with the electric front derailleur 12 in an installed position. Also the first and second link members 50 and 52 are at least partially aligned with the chain guide 22 in a lateral direction with the electric front derailleur 12 in the installed position. In this way, the four bar linkage 56 is completely offset in a lateral direction from the chain guide 22 with the electric front derailleur 12 in the installed position. These configurations help in providing a vertically compact arrangement of the electric front derailleur 12 in the installed position.

As seen in FIG. 2, the first link member 50 has a first end 50a pivotally mounted to the base member 20 about a first axis P1 and a second end 50b pivotally mounted to the chain guide 22 about a second axis P2. The second link member 52 has a third end 52a pivotally mounted to the base member 20 about a third axis P3 and a fourth end 52b pivotally mounted to the chain guide 22 about a fourth axis P4.

As seen in FIG. 2, the first axis P1 is disposed above the second axis P2 with the electric front derailleur 12 in the installed position, and the third axis P3 is disposed above the fourth axis P4 with the electric front derailleur 12 in the installed position. The first axis P1 is disposed above the fourth axis P4 with the electric front derailleur 12 in the installed position. The third axis P3 is disposed above the second axis P2 with the electric front derailleur 12 in the installed position. The first, second, third and fourth axes P1, P2, P3 and P4 are all disposed between the chain cage portion 23 and the bicycle frame 10 in the lateral direction with the electric front derailleur 12 in the installed position.

Figure 5:
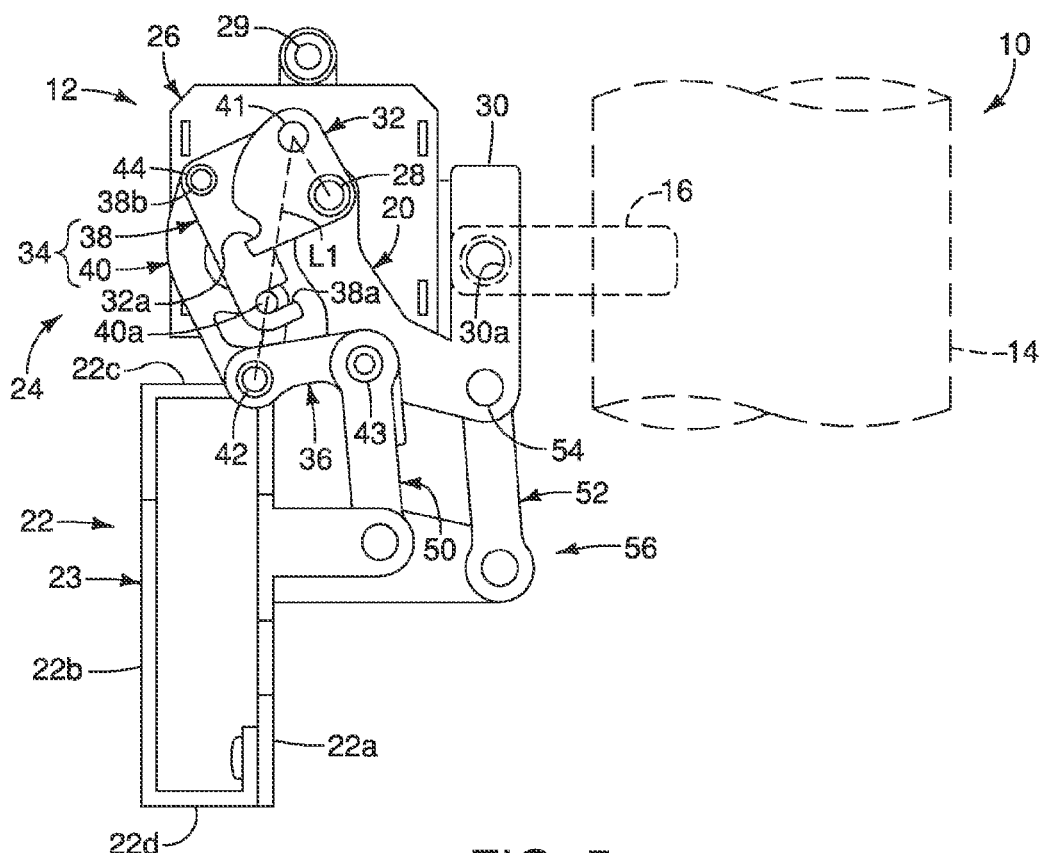
FIG. 5 is a front elevational view of the electric front derailleur illustrated in FIG. 1 with the chain guide in between the low position and the middle position.
Figure 7:
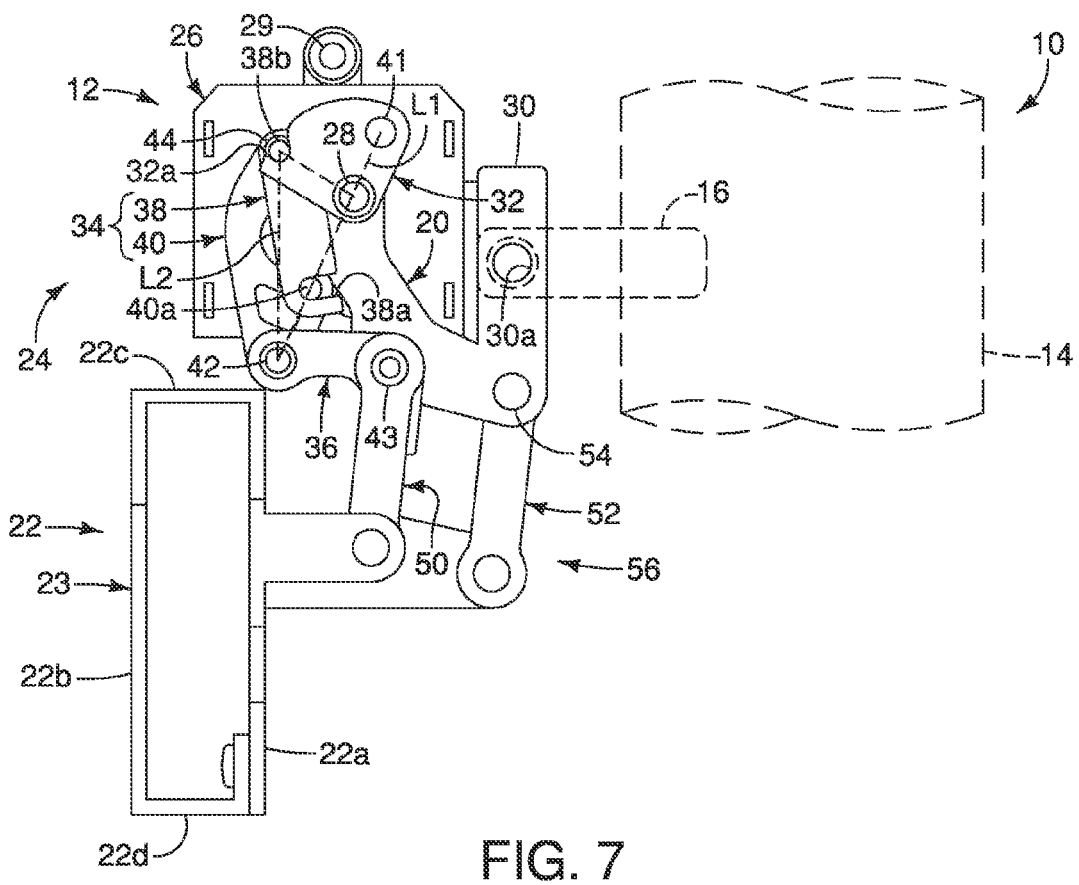
FIG. 7 is a front elevational view of the electric front derailleur illustrated in FIG. 1 with the chain guide in the middle position.
Figure 8:
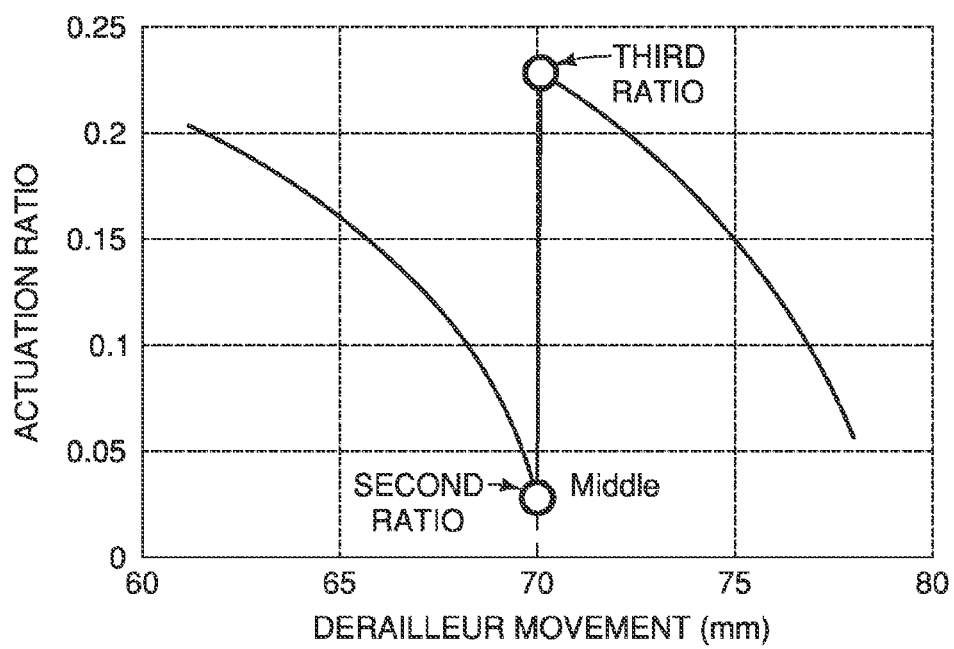
FIG. 8 is a graph plotting the actuation ratio with respect to the transverse movement of the chain guide of the electric front derailleur illustrated in FIG. 1, wherein the chain guide is in the middle position.
Figure 9:
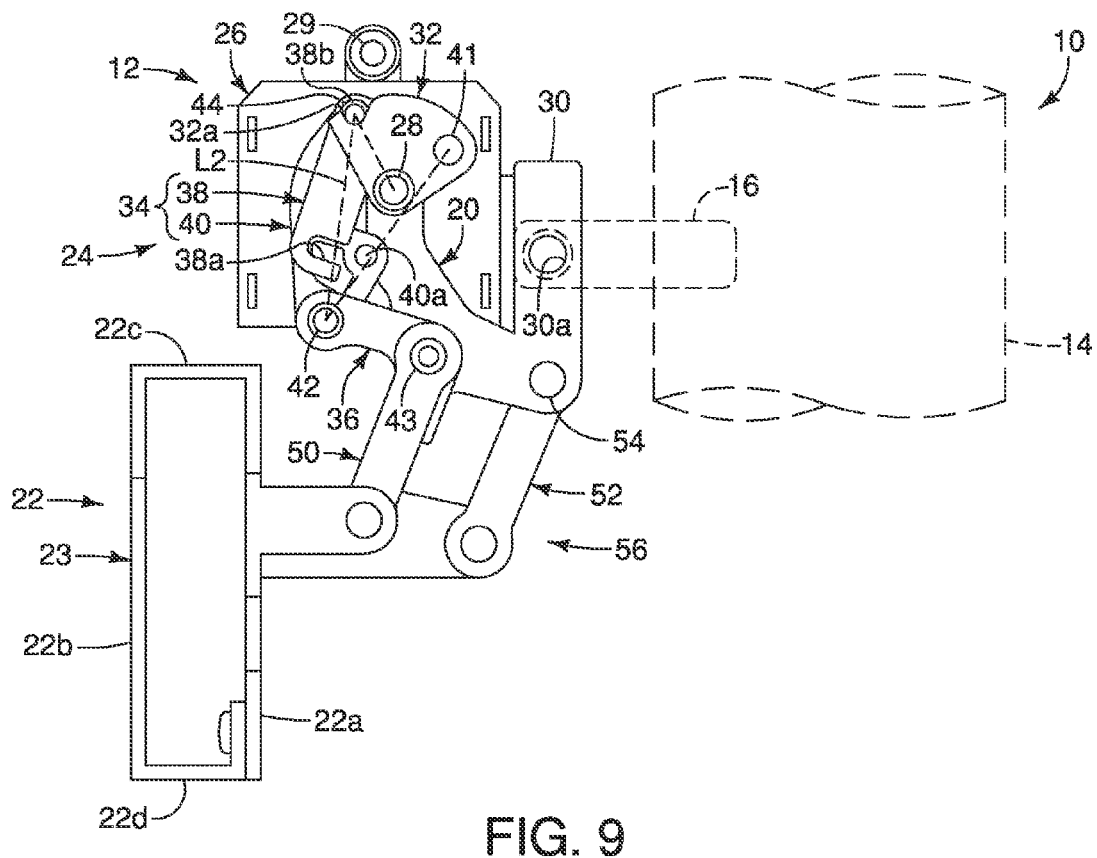
FIG. 9 is a front elevational view of the electric front derailleur illustrated in FIG. 1 with the chain guide in between the middle position and the top position.

Basically, as seen in FIGS. 3, 5 and 7, the connecting link 34 has a first effective length L1 as the chain guide 22 moves from the first position toward the intermediate position. As seen in FIGS. 7, 9 and 11, the connecting link 34 has a second effective length L2 as the chain guide 22 moves from the intermediate position toward the second position. The first effective length L1 of the connecting link 34 is greater than the second effective length L2 of the connecting link 34.

More specifically, the first switching pin 40a is engaged with the first slot 38a to form a first output arm as the chain guide 22 moves from the first position toward the intermediate position. The first output arm extends from the center of the first pivot shaft 41 to the center of the second pivot shaft 42, and has the first effective length L1. The first switching pin 40a is disposed closer to the second pivot shaft 42 than the fourth pivot shaft 44. The second switching pin 38b is engaged with the second slot 32a to form a second output arm as the chain guide 22 moves from the intermediate position toward the second position. The second output arm extends from the center of the fourth pivot shaft 44 to the center of the second pivot shaft 42, and has the second effective length L2.

Figure 6:
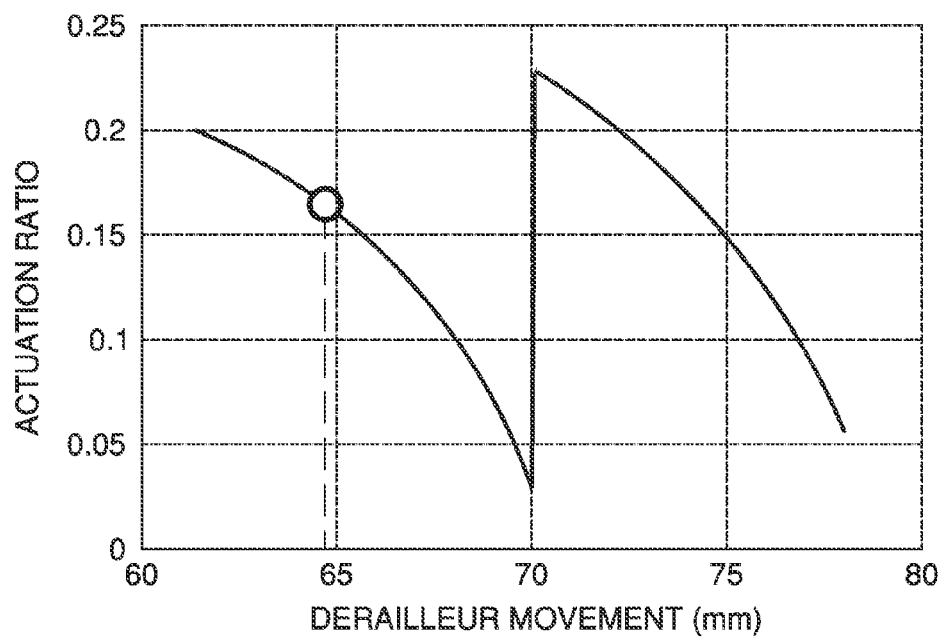
FIG. 6 is a graph plotting the actuation ratio with respect to the transverse movement of the chain guide of the electric front derailleur illustrated in FIG. 1, wherein the chain guide is in between the low position and the middle position.
Figure 10:
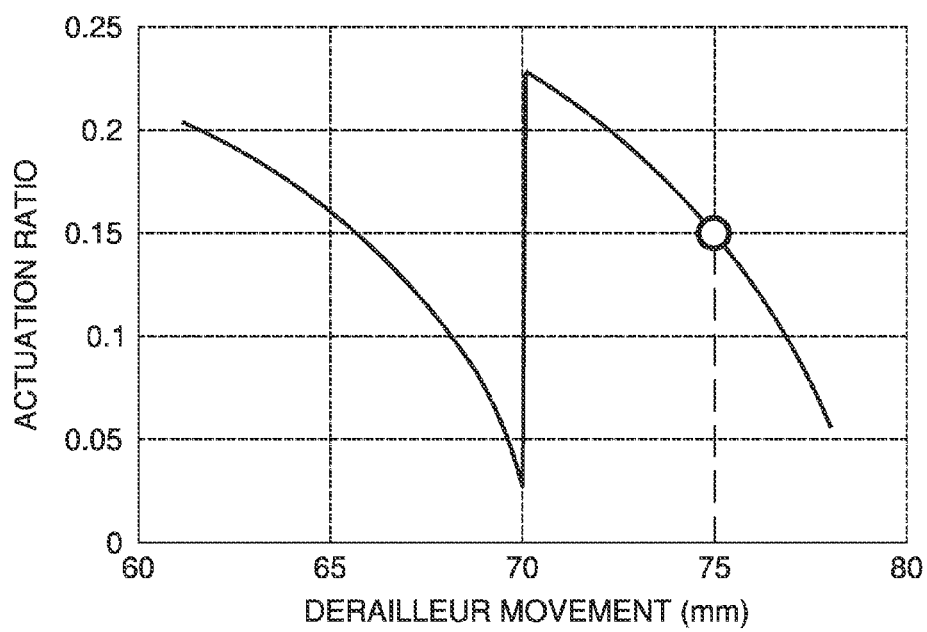
FIG. 10 is a graph plotting the actuation ratio with respect to the transverse movement of the chain guide of the electric front derailleur illustrated in FIG. 1, wherein the chain guide is in between the middle position and the top position.
Figure 12:
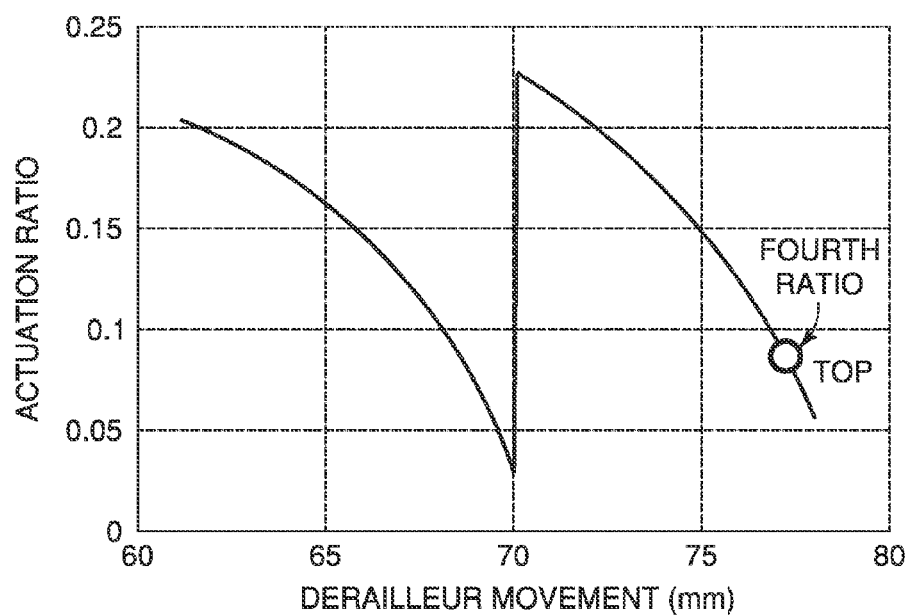
FIG. 12 is a graph plotting the actuation ratio with respect to the transverse movement of the chain guide of the electric front derailleur illustrated in FIG. 1, wherein the chain guide is in the top position.

As seen in the graphs of FIGS. 4, 6, 8, 10 and 12, with this arrangement of the connecting structure 24, the connecting structure 24 moves the chain guide 22 with an actuation ratio that descends and then ascends as the chain guide 22 moves from the first position (i.e., the fully retracted position) towards the second position (i.e., the fully extended position). As illustrated in FIG. 4, the actuation ratio changes in order of a first ratio, a second ratio being smaller than the first ratio, and a third ratio being greater than the second ratio, as the chain guides 22 moves from the first position (FIG. 4) towards the second position (FIG. 12). In this way, the actuation ratio descends from the first ratio to the second ratio as seen in FIGS. 4, 6 and 8, and then ascends from the second ratio to the third ratio as seen in FIG. 8. The actuation ratio is switched from the second ratio to the third ratio at an intermediate position between the first position (e.g., the "LOW" position) and the second position (e.g., the "TOP" position) when the first switching pin 40a is disengaging from the first slot 38a and the second switching pin 38b is engaging with the second slot 32a. Preferably, the intermediate position is adjacent to a midpoint between the first position and the second position, but could be at other positions. Lastly, as seen in FIGS. 8, 10 and 12, the actuation ratio descends from the third to a fourth ratio that is smaller than the third ratio as the chain guide 22 moves from the first position towards the second position. In the illustrated embodiment, the first and third ratios are more than twice the second ratio, and the first and third ratios are more than twice the fourth ratio.

In performing a chain shifting operation, the motor M is operated by a user operating device (not shown) to turn the output shaft 28 (i.e., the input member of the connecting structure 24) of the electric driving unit 26. Depending on the rotational direction of the output shaft 28, the connecting structure 24 will either move the chain guide 22 towards or away from the seat tube 14 of the bicycle 10. When the chain guide 22 is in the first position (e.g., the fully retracted position), the output shaft 28 will rotate in a clockwise direction as seen in FIGS. 3, 5, 7, 9 and 11 to move the chain guide 22 towards the second position. Thus, the driving link 32 will also rotate with the output shaft 28 in the clockwise direction as seen in FIGS. 3, 5, 7, 9 and 11. In the first position, the first switching pin 40a is engaged with the first slot 38a and the second switching pin 38b is disengaged from the second slot 32a. Thus, the first and second arms 38 and 40 are connected together as a rigid unit to form the first output arm with the first effective length L1. With the first switching pin 40a is engaged with the first slot 38a, the driven link 36 and the first and second link members 50 and 52 are moved by the connecting structure 24 with the first output arm acting between the first pivot shaft 41 and the second pivot shaft 42.

However, as the output shaft 28 continues to rotate the driving link 32 in the clockwise direction, the second slot 32a of the driving link 32 will eventually hook onto the second switching pin 38b of the fourth pivot shaft 44. As the second slot 32a hooks onto the second switching pin 38b, the first switching pin 40a begins to disengage from the first slot 38a. This results in the first and second arms 38 and 40 being connected together as a rigid unit to form the second output arm with the second effective length L2. In other words, the connecting structure 24 switches from the first output arm to the second output arm. With the second slot 32a engaged with the second switching pin 38b, the driven link 36 and the first and second link members 50 and 52 are moved by the connecting structure 24 with the second output arm acting between the fourth pivot shaft 44 and the second pivot shaft 42.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms first and second may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function.

Although a four bar linkage is used in the illustrated embodiment, as discussed above, the chain guide 22 can be connected to the base member 20 with other coupling arrangements. In other words, the electric front derailleur 12 can be configured to have a coupling arrangement which is constructed with a single link member, or which is constructed with more than two link members. Thus, the present invention can be used with electric front derailleurs that use other types of coupling arrangements.

Also components that are shown directly connected or contacting each other can have intermediate structures disposed between them, unless specifically stated otherwise. The functions of one element can be performed by two, and vice versa, unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electric front derailleur comprising:
a base member including a mounting portion configured to be operatively mounted to a bicycle frame;
a chain guide being movable with respect to the base member in a lateral direction between a low position and a high position, the lateral direction being a direction toward and away from the bicycle frame when the mounting portion is operatively mounted to the bicycle frame, the chain guide being closer to the bicycle frame in the low position than in the high position, the chain guide including a chain cage portion configured to define a chain receiving slot for a chain to pass through;
a first link member movably connecting the chain guide to the base member, the first link being pivotally supported by the base member, the first link member at least partially overlapping with the chain guide in a side view of the electric front derailleur, the side view being taken along a direction corresponding to the lateral direction in which the chain guide is movable with respect to the base member;
a second link member movably connecting the chain guide to the base member, the second link member being pivotally supported by the base member, the second link member at least partially overlapping with the chain guide in the side view;
an electric driving unit including a motor and an output shaft, the electric driving unit being supported on the base member such that the output shaft is rotatable with respect to the base member, the electric driving unit being arranged offset from the chain guide in a vertical direction that is perpendicular to a plane including the lateral direction, the output shaft overlapping the mounting portion of the base member in the side view; and
a connecting structure coupled between the output shaft and at least one of the first and second link members, the connecting structure being configured to transmit rotation of the output shaft to the at least one of the first and second link members to move the at least one of the first and second link members with respect to the base member, the connecting structure at least partially overlapping the motor and the base member when the electric front derailleur is viewed from at least one direction perpendicular to the vertical direction, the connecting structure being configured and arranged to at least partially overlap the chain cage portion of the chain guide when the electric front derailleur is viewed from a longitudinal direction while the chain guide is in the low position, the longitudinal direction being perpendicular to both the lateral direction and the vertical direction.

2. The electric front derailleur according to claim 1, wherein
the first and second link members defining a four bar linkage between the base member and the chain guide.

3. The electric front derailleur according to claim 2, wherein
the first link member has a first end pivotally mounted to the base member about a first axis and a second end pivotally mounted to the chain guide about a second axis, the second link member has a third end pivotally mounted to the base member about a third axis and a fourth end pivotally mounted to the chain guide about a fourth axis.

4. The electric front derailleur according to claim 3, wherein the first axis is disposed higher in the vertical direction than the second axis when the mounting portion is operatively mounted to the bicycle frame, and the third axis is disposed higher than the fourth axis in the vertical direction when the mounting portion is operatively mounted to the bicycle frame.

5. The electric front derailleur according to claim 4, wherein
the first axis is disposed higher in the vertical direction than the fourth axis when the mounting portion is operatively mounted to the bicycle frame, and the third axis is disposed higher in the vertical direction than the second axis when the mounting portion is operatively mounted to the bicycle frame.

6. The electric front derailleur according to claim 3, wherein
the chain guide has a chain cage portion configured for a chain to pass through, the second and fourth axes are disposed between the chain cage portion and the bicycle frame in the lateral direction when the mounting portion is operatively mounted to the bicycle frame.

7. The electric front derailleur according to claim 6, wherein
the first and third axes are disposed between the chain cage portion and the bicycle frame in the lateral direction when the mounting portion is operatively mounted to the bicycle frame.

8. The electric front derailleur according to claim 1, wherein
the chain guide has a chain cage portion configured for a chain to pass through,
the first link member is located closer to the chain cage portion than the second link member, the connecting structure is connected to the first link member.

9. The electric front derailleur according to claim 8, wherein
the connecting structure includes a driving link operatively coupled to the output shaft of the electric driving unit.

10. The electric front derailleur according to claim 1, wherein
the electric driving unit includes a housing that encloses the motor, at least a portion of housing, at least a portion of the connecting structure, and at least a portion of the base member being disposed at the same height in the vertical direction.

11. The electric front derailleur according to claim 1, wherein
the output shaft of the electric driving unit is separate from the motor.

12. The electric front derailleur according to claim 1, wherein
the connecting structure includes a driving link that is fixedly coupled to the output shaft and arranged to at least partially overlap the base member when the electric front derailleur is viewed from the at least one direction perpendicular to the vertical direction.

13. An electric front derailleur comprising:
a base member including a mounting portion configured to be operatively mounted to a bicycle frame;
a chain guide being movable with respect to the base member in a lateral direction between a low position and a high position, the lateral direction being a direction toward and away from the bicycle frame when the mounting portion is operatively mounted to the bicycle frame, the chain guide being closer to the bicycle frame in the low position than in the high position, the chain guide including an inner plate and an outer plate spaced apart from the inner plate, the inner plate and the outer plate being connected to each other at upper portions thereof by a top connecting member and being connected to each other at lower portions thereof by a bottom connecting member to define a chain cage portion configured for a chain to pass through;
an electric driving unit supported on the base member and configured to move the chain guide with respect to the base member, the electric driving unit including a motor and an output shaft, the output shaft being rotatable with respect to the base member, the electric driving unit being arranged offset from the chain guide in a vertical direction that is perpendicular to a plane including the lateral direction, the output shaft overlapping the mounting portion of the base member in the side view;
a linkage including a first link member and a second link member, the first and second link members being pivotally supported by the base member and operatively connecting the chain guide to the base member, the first and second link members being configured not to enter an area directly above the top connecting member of the chain cage portion when the mounting portion is operatively mounted to the bicycle frame; and
a connecting structure operatively coupling the output shaft of the electric driving unit to the linkage, the connecting structure at least partially overlapping with the motor and the base member when the electric front derailleur is viewed from at least one direction perpendicular to the vertical direction, the connecting structure being configured and arranged to at least partially overlap the chain cage portion of the chain guide when the electric front derailleur is viewed from a longitudinal direction while the chain guide is in the low position, the longitudinal direction being perpendicular to both the lateral direction and the vertical direction.

14. The electric front derailleur according to claim 13, wherein
the electric driving unit is supported on the base member above the chain guide.

15. The electric front derailleur according to claim 13, wherein
the first link member has a first end pivotally mounted to the base member about a first axis and a second end pivotally mounted to the chain guide about a second axis.

16. The electric front derailleur according to claim 15, wherein
the second link member has a third end pivotally mounted to the base member about a third axis and a fourth end pivotally mounted to the chain guide about a fourth axis, the first link member and the second link member defining a four bar linkage.

17. The electric front derailleur according to claim 16, wherein
the first and second link members are at least partially overlapping with the chain guide in a side view of the electric front derailleur, the side view being taken along a direction corresponding to the lateral direction in which the chain guide is movable with respect to the base member.

18. The electric front derailleur according to claim 16, wherein
the first axis is disposed higher than the second axis when the mounting portion is operatively mounted to the bicycle frame, and the third axis is disposed higher in the vertical direction than the fourth axis when the mounting portion is operatively mounted to the bicycle frame.

19. The electric front derailleur according to claim 18, wherein
the first axis is disposed higher in the vertical direction than the fourth axis when the mounting portion is operatively mounted to the bicycle frame, and the third axis is disposed higher in the vertical direction than the second axis when the mounting portion is operatively mounted to the bicycle frame.

20. The electric front derailleur according to claim 5, wherein
the connecting structure operatively couples the output shaft of the electric driving unit to the chain guide through at least one of the first and second link members.

21. The electric front derailleur according to claim 20, wherein
the electric driving unit is operatively coupled to the chain guide through the first link member.

22. The electric front derailleur according to claim 21, wherein
the first link member is located closer to the chain cage portion than the second link member.

23. The electric front derailleur according to claim 22, wherein
the connecting structure includes a driving link operatively coupled to the output shaft of the electric driving unit.

24. The electric front derailleur according to claim 13, wherein
the electric driving unit includes a housing that encloses the motor, at least a portion of housing, at least a portion of the connecting structure, and at least a portion of the base member being disposed at the same height in the vertical direction.

25. The electric front derailleur according to claim 13, wherein
the output shaft of the electric driving unit is separate from the motor.

26. The electric front derailleur according to claim 13, wherein
the connecting structure includes a driving link that is fixedly coupled to the output shaft and arranged to at least partially overlap the base member when the electric front derailleur is viewed from the at least one direction perpendicular to the vertical direction.

27. An electric front derailleur comprising:
a base member including a mounting portion configured to be operatively mounted to a bicycle frame;
a chain guide being movable with respect to the base member in a lateral direction between a low position and a high position, the lateral direction being a direction toward and away from the bicycle frame when the mounting portion is operatively mounted to the bicycle frame, the chain guide being closer to the bicycle frame in the low position than in the high position, the chain guide having a chain cage portion configured for a chain to pass through;
an electric driving unit supported on the base member and configured to move the chain guide with respect to the base member, the electric driving unit including a motor and an output shaft, the output shaft being rotatable with respect to the base member, the electric driving unit being arranged offset from the chain guide in a vertical direction that is perpendicular to a plane including the lateral direction, the output shaft overlapping the mounting portion of the base member in the side view;
a linkage operatively connecting the chain guide to the base member, the linkage being arranged at a location spaced from an area directly above the chain cage when the mounting portion is operatively mounted to the bicycle frame, the linkage including a first link member and a second link member so as to be a four bar linkage, the first link member having a first end pivotally mounted to the base member about a first axis and a second end pivotally mounted to the chain guide about a second axis, the second link member having a third end pivotally mounted to the base member about a third axis and a fourth end pivotally mounted to the chain guide about a fourth axis, the second and fourth axes being disposed between the chain cage portion and the bicycle frame when the mounting portion is operatively mounted to the bicycle frame; and
a connecting structure operatively coupling the output shaft of the electric driving unit to the linkage, the connecting structure at least partially overlapping with the motor and the base member when the electric front derailleur is viewed from at least one direction perpendicular to the vertical direction, the connecting structure being configured and arranged to at least partially overlap the chain cage portion of the chain guide when the electric front derailleur is viewed from a direction parallel to the first axis while the chain guide is in the low position.

28. The electric front derailleur according to claim 27, wherein
the first and third axes are disposed between the chain cage portion and the bicycle frame in the lateral direction when the mounting portion is operatively mounted to the bicycle frame.

29. The electric front derailleur cording to claim 27, wherein
the electric driving unit includes a housing that encloses the motor, at least a portion of housing, at least a portion of the connecting structure, and at least a portion of the base member being disposed at the same height in the vertical direction.

30. The electric front derailleur according to claim 27, wherein
the output shaft of the electric driving unit is separate from the motor.

31. The electric front derailleur according to claim 27, wherein
the connecting structure includes a driving link that is fixedly coupled to the output shaft and arranged to at least partially overlap the base member when the electric front derailleur is viewed from the at least one direction perpendicular to the vertical direction.

* * * * *